April 4, 1967 A. A. JORGENSEN 3,312,787

SIGNALING SYSTEM

Filed Oct. 17, 1963 2 Sheets-Sheet 1

INVENTOR.
ADAM A. JORGENSEN
BY George W. Killian
AGENT

SIGNALING SYSTEM

Filed Oct. 17, 1963 2 Sheets-Sheet 2

United States Patent Office 3,312,787

Patented Apr. 4, 1967

3,312,787

SIGNALING SYSTEM

Adam A. Jorgensen, Charlottesville, Va., assignor, by mesne assignments, to Stromberg-Carlson Corporation, Rochester, N.Y., a corporation of Delaware Filed Oct. 17, 1963, Ser. No. 316,836
6 Claims. (Cl. 179—84)

This invention relates in general to signaling systems and, more particularly, to circuit means for providing a signal at one end of a communication channel which is indicative of circuit conditions at the other end of the communication channel.

Although the invention herein disclosed is suitable for more general application, it is particularly well adapted for use in automatic telephone systems to provide supervision at the central office to indicate when a called phone has answered. In the well known and widely used step-by-step telephone systems, it is usual to employ a relay in the ringing circuit which is designed to respond only to the flow of a direct current. During the ringing period, no direct current flows since the circuit at the called phone includes a capacitor which blocks direct current. However, when the call is answered, and the hookswitch is operated, a direct current circuit is completed and the mentioned relay operates to provide answer supervision. In telephone systems, this operation is usually referred to as a ring trip operation and it is believed to be so well known to those skilled in the telephone art that no further description thereof is necessary.

Recently, telephone systems have been designed which operate on a radically different principle from the usual electromechanical systems. One of the newer systems employing time division multiplex techniques has been quite successful. Because the new and old systems must be compatible, it is necessary to provide adapter circuits between the equipments that work together and/or to make other special provisions. One of the problems is that the type of ringer that was used in electromechanical systems is not the type that would be most economical and convenient for use in a time division multiplex system. However, the type of ringer equipment that is most economical and convenient for use in a time division multiplex system is not suitable for use with the conventional electromechanical telephone systems. Accordingly, either telephones with new ringers must be used with time division multiplex systems or the time division multiplex system must be modified to provide a ringing signal which will be effective to operate the ringers of conventional phones. The choice of which modification is made will depend upon many economic considerations which is not necessary to discuss here.

In a system employing time division multiplex techniques or other electronic techniques, but which employs conventional telephones and ringers, there is a problem in detecting answer supervision. One technique for detecting answer supervision is disclosed in the copending application of Adam A. Jorgensen, Ser. No. 90,412, filed Feb. 20, 1961, now Patent No. 3,223,787 and assigned to the same assignee as the present invention. In the cited system, various relays were required; whereas, in the system of the present invention, the number of relays has been substantially reduced and by suitable arrangement all relays could be eliminated.

It is the general object of this invention to provide a new and improved signaling system.

It is a more particular object of this invention to provide a new and improved means for producing a signal at one end of the communication channel which is indicative of circuit conditions at the other end of the channel.

It is another object of this invention to provide new and improved means for providing an answer supervision signal in a modern telephone system.

One embodiment of the present invention may be incorporated in a telephone system employing conventional ringers. In such a system, an alternating current ringing potential superimposed on a direct current potential is applied to the line to activate the ringer. Since the ringer is bridged across the line in series with a capacitor, no direct current component will flow. Howver, when the call is answered, a direct current is completed and a direct current component will flow in the line. One of the lines includes network means to which is coupled sampling means for sampling the potential drop across that network means. When a direct current component flows through the network, the potential across the network changes and the sampling means indicates the change. If the sampling means detects the changed potential drop for a predetermined period of elapsed time, it is an indication that the called phone has been answered and a signal will be provided to activate other means for terminating the application of the A.C. ringing signal.

Further objects and advantages of the invention will become apparent as the following description proceeds, and features of novelty which characterize the invention will be pointed out with particularity in the claims annexed to and forming a part of this specification.

For a better understanding of the invention, reference may be had to the accompanying drawings in which.

Figure 1:
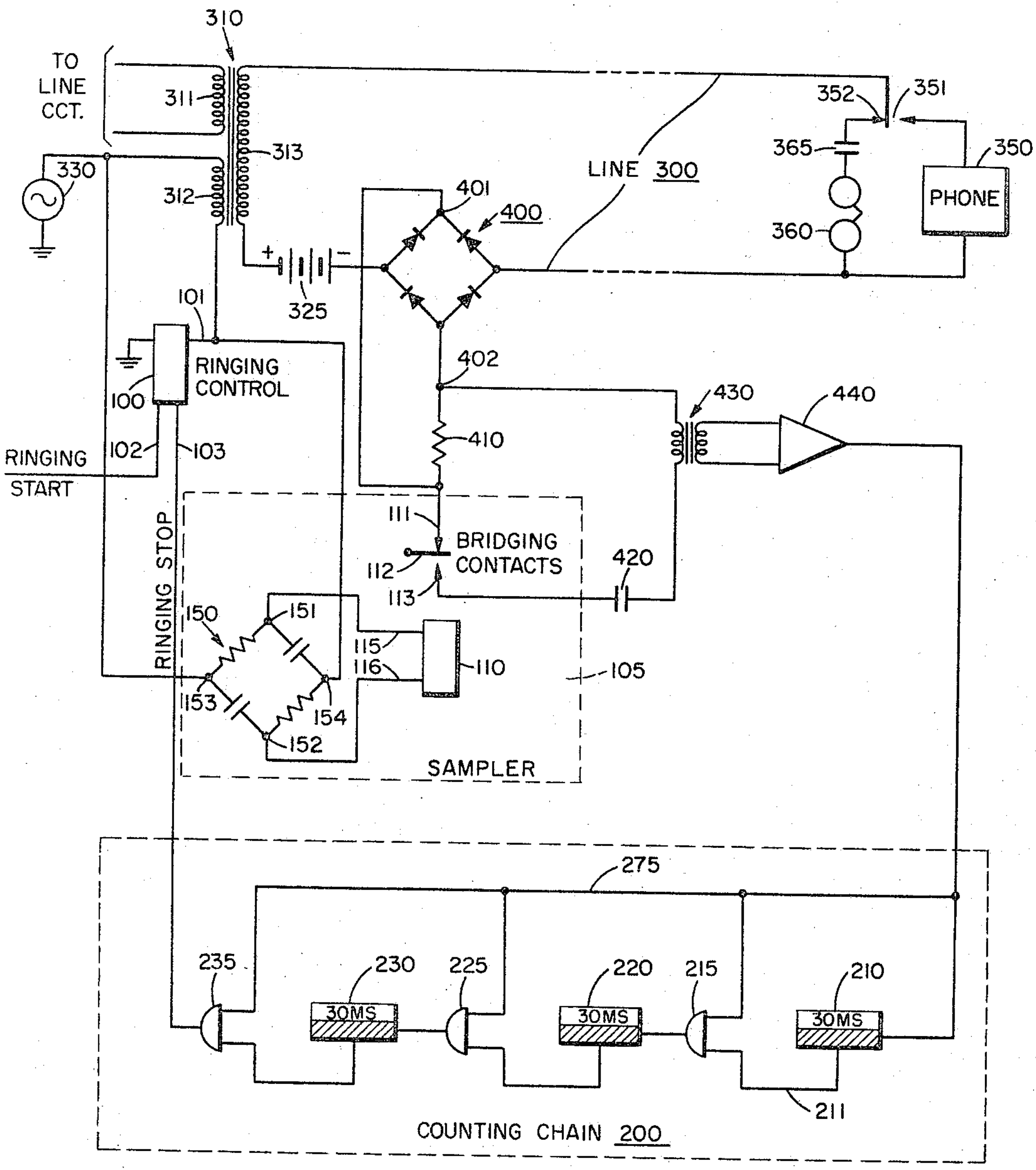
FIG. 1 illustrates the invention in combined logic and schematic form.

It is to be understood that only the details of the circuit necessary to understand the invention have been shown. For example, the illustrated embodiment of the invention uses monostable multivibrators, AND gates, and an amplifier. The circuit details of these components have not been shown since they form no part of the present invention and typical circuits for these components are well known to those skilled in the art. Typical circuit details for these devices may be seen in Patent No. 2,979,570, issued on Apr. 11, 1961, to Barrie Brightman.

Monostable vibrators are represented in the drawings by two equal rectangles which have a common side. One of the rectangles is shaded to indicate that one of the transistors comprising the multivibrator is normally conducting. In the normal state, the leads connected to the midpoints of the longer side of the rectangles are at ground and negative potential for the shaded and unshaded halves, respectively. When a monostable multivibrator is triggered so that the normally conducting transistor is "off" and the normally nonconducting transistor is "on," the potential applied to the two output leads is reversed. The multivibrator may be triggered by the application of a positive-going pulse or a negative-going pulse to the output leads from the shaded and unshaded sides, respectively. Or, the multivibrator may be triggered by the application of a positive-going pulse or a negative-going pulse to the input leads connected to the shorter side of the shaded and unshaded sides, respectively. The time duration of the output signal is indicated in the unshaded rectangle.

AND gates are represented in the drawings by a symbol which has the general shape of a D. The inputs to an AND gate are drawn to the straight line part of the D, while the output is drawn from the arcuate portion of the D. All the AND gates illustrated in the drawings are of the type that will provide a negative output potential only when all the inputs are negative. When any one or more of the inputs to an AND gate are positive, the output potential will rise to a more positive potential.

OR gates are similar in appearance to AND gates, but are distinguished therefrom by having the input leads extend beyond the straight line portion of the D and to the arcuate portion. All the OR gates illustrated in the drawings are of the type that will provide a negative output potential when one or more of the inputs are negative. When all of the inputs to an OR gate are positive, the output potential will rise to a more positive potential.

Amplifiers are represented by an isosceles triangle with the input at the base and the output at the apex. The amplifiers used in the illustrated embodiment of the invention provide a ground or positive output signal at all times except when a negative input signal is applied to the input of the amplifier. Accordingly, the application of a negative signal to the input of the amplifier causes the amplifier to remove an inhibiting ground potential.

In addition, a ringing control and a sampler are illustrated. The ringing control may be a simple electromechanical relay or a more sophisticated solid state device as may be desired for the particular application. The ringing control device 100 serves to apply ground to lead 101 after a ringing start pulse has been applied to lead 102, and to remove the ground from lead 101 after a ringing stop pulse has been applied to lead 103. The sampler 105 includes a relay 110 having contacts 111, 112 and 113. In response to the application of a predetermined potential across the relay input leads 115 and 116, contacts 111, 112 and 113 are actuated in such a manner that contacts 111 and 113 are bridged for a period of time approximating one-quarter to three-quarters of one millisecond each time the relay is energized. The relay may be a bistable relay having mercury wetted contacts. The sampler also includes a phase shift network 150.

It is believed that the invention can best be understood by considering the following detailed description together with the associated drawings in which the invention is illustrated as used in a telephone system.

In telephone systems, the subscriber's ringers are operated from an alternating current source which usually has a frequency within the range of 16 to 66 cycles per second. For the present explanation, it will be assumed that the ringing potential source 330 has a frequency of 20 cycles per second. When it is desired to start ringing the ringer 360 which is part of telephone 350, the system will, by means not shown, apply a ringing start signal to lead 102. In response to the signal on lead 102, the ringing control device 100 will connect ground to lead 101. With ground connected to lead 101, the potential source 330 will be applied to winding 312 of transformer 310 and across points 153 and 154 of phase shift network 150 which forms a part of sampler 105. The application of the alternating current potential to winding 312 will cause an alternating current potential to be induced in winding 313 which is coupled to line 300 through trip battery 325 and the rectifier bridge network 400. The capacitor 365 will be effective to prevent the flow of any direct current component from battery 325 and the ringer 360 will be operated from the alternating current signal.

Figure 2:
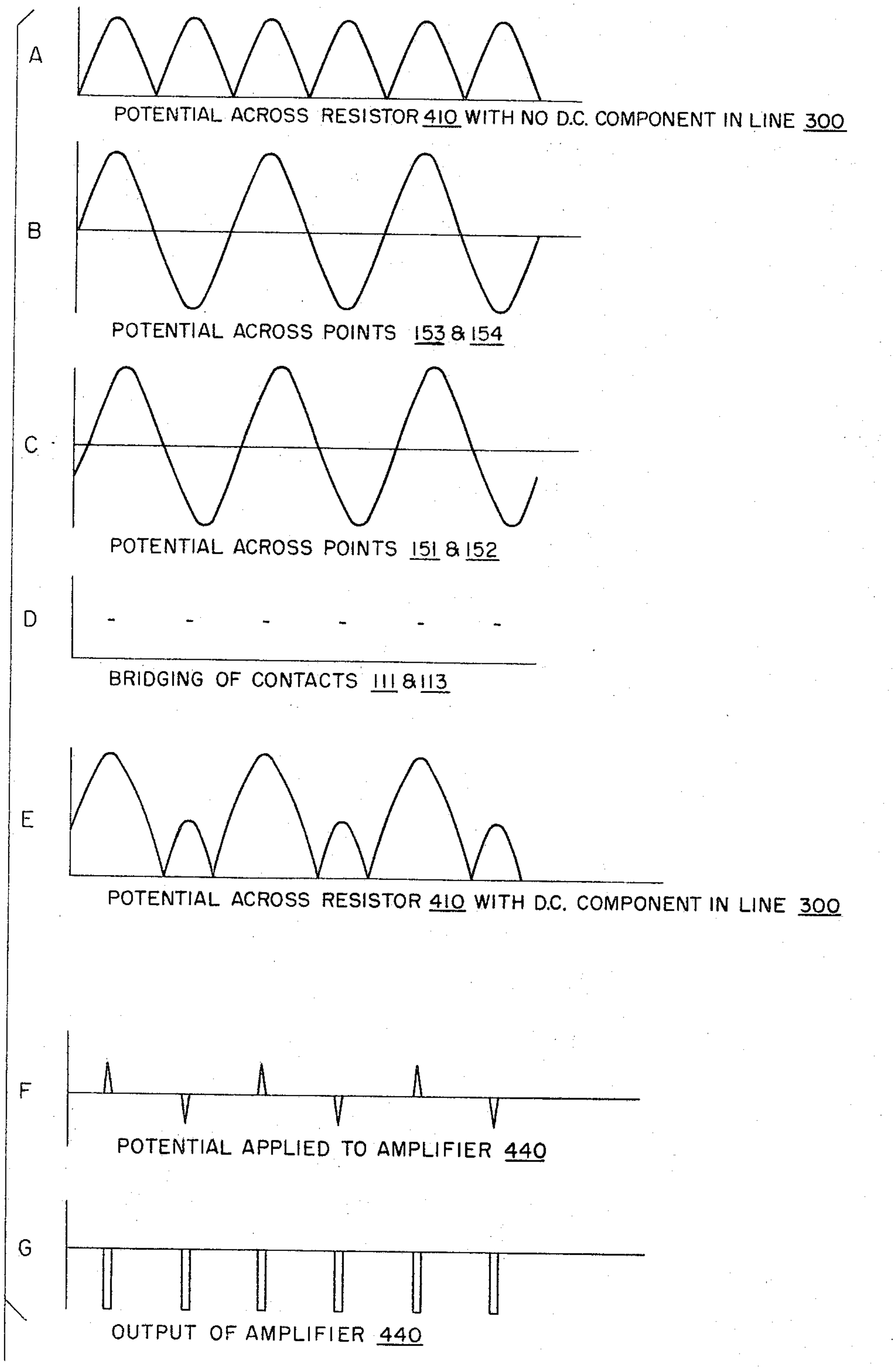
FIG. 2 illustrates the shapes of various potentials in the system.

The potential across points 401 and 402 of the bridge network 400 is applied across resistor 410 and will have the shape illustrated as A in FIG. 2. The potential across winding 312 is assumed to be sinusoidal and therefore the input to the phase shift network 150 will be sinusoidal. The output of the network 150 will appear across terminals 151 and 152 and will also be sinusoidal, but shifted a few degrees from the input. The amount of shift will depend upon the design and circuit constants of network 150. The potentials across points 153 and 154 and that across terminals 151 and 152 are shown in FIG. 2 as B and C, respectively. The output potential of the phase shift network is applied as an intput to the relay 110. The relay 110 may comprise, for example, a bistable polar relay having mercury-wetted contacts. The contacts 111, 112 and 113 associated with the relay will, therefore, shift from one position to the other each time the potential applied to the operating winding 110 of the sampler approaches a maximum value, either positive or negative. The contacts of the relay are designed to be bridging so that for a brief time during each operation there will be an electrical continuity from terminal 111 to terminal 113. The phase shift and the relay are so chosen that the actual bridging of the contacts will occur once each half-cycle. For convenience and maximum effectiveness, the bridging will be arranged to occur at the time that the potential across points 401 and 402 is a maximum. The contacts 111 and 113 may bridge for approximately one-quarter to three-quarters of one millisecond. The frequency and phasing of the bridging is indicated in FIG. 2 at D.

The capacitor 420 will be charged to a potential which is substantially equal to the peak potential shown at A; and as long as the capacitor is held at this charge, there will be no transformer action between the windings of transformer 430 and, therefore there will be no input into amplifier 440. That is, the charged capacitor 420 provides, for all practical purposes, an open circuit.

In summary, once a ringing start signal is applied to lead 102, the ringer 360 will be operated from an alternating current potential superimposed on a D.C. potential and capacitor 365 will block the flow of any D.C. component of current. No potential will be induced into the right-hand winding of transformer 430.

However, when the handset (not shown) is lifted at the telephone 350, the hookswitch contacts 351 and 352 will close and open, respectively. The closure of contacts 351 will complete a D.C. path between the conductors 300 and direct current from battery 325 will flow. The direct current component will bias the diodes in bridge network 400 thereby changing the potential across resistor 410. If it is assumed that the alternating current ringing potential across line 300 has a magnitude in the order of 90 volts while the D.C. potential 325 has a magnitude of approximately 50 volts, the potential across resistor 410 with a direct current in line 300 will have approximately the shape shown in FIG. 2 at E.

As a result of the fact that the potential across resistor 410 is at different levels each time the relay 110 completes a circuit from terminal 111 to 113, the charge on capacitor 420 will be changed with each sample and therefore a potential will be induced in the right-hand winding of transformer 430. The voltage induced in transformer 430 will have the general shape illustrated in FIG. 2 at F.

Each negative-going pulse that is applied to amplifier 440 causes it to produce a negative output pulse, as shown in FIG. 2 at G. The amplifier output pulses are applied on lead 275 as inputs to all the AND gates and monostable multivibrators of the counting chain 200. A negative pulse is not passed through any of the AND gates in response to the first negative pulse on lead 275 as each of the AND gates is inhibited by the positive potential from the output of the multivibrator preceding it. That is, the AND gates will pass a negative pulse only when all inputs are negative and one input of each is held positive by the normal positive output from the shaded side of each of the multivibrators.

The first negative pulse from amplifier 440 that is applied to multivibrator 210 will trigger multivibrator 210 at the end of the pulse as the pulse goes positive. After multivibrator 210 has been triggered by the trailing edge of the first negative pulse applied to lead 275, the output lead 211 of multivibrator 210 will be shifted from a positive to a negative potential for 30 milliseconds as indicated in the unshaded section of multivibrator 210. It should be recalled, at this time, that it was assumed that a 20-cycle A.C. potential is supplied from source 330. Therefore, each cycle has a period of 50 milliseconds and each half-cycle a period of 25 milliseconds. The relay 110 samples the potential derived from bridge 400 and applied across resistor 410 each half-cycle, or each 25 milliseconds. Therefore, if a D.C. circuit has been completed between conductors 300 by answering the phone 350, a negative pulse will be applied to lead 275 once each 25 milliseconds. Thus, within the 30 millisecond time that multivibrator 210 will hold a negative potential on lead 211 to enable AND gate 215, another negative pulse will appear on lead 275 and be passed through AND gate 215 to trigger multivibrator 220. Multivibrator 220 will enable AND gate 225 which will enable the third negative pulse on lead 275 to trigger multivibrator 230. Finally, the fourth negative pulse on lead 275 will pass through AND gate 235.

The counting chain 200 is used to check that a true answer condition has obtained, as indicated by successive negative pulses supplied with not more than the time of one-half a cycle between them. If a different frequency ringing potential were used, it would be necessary to substitute different multivibrators in the counting chain 200 which would maintain an output pulse for a time slightly greater than the time period of one-half a cycle.

The negative signal passed through AND gate 235 will be applied to the ringing control device 100 on stop lead 103. In response to this signal, the ringing control device 100 will disconnect the ground from lead 101 thereby disconnecting the A.C. ringing potential 330 and terminating the application of the ringing potential to line 300.

Each multivibrator, once triggered, will remain triggered as long as negative pulses are applied to lead 275 at half-cycle intervals.

If there is no chance of having false signals on lead 275, the counting chain 200 could be eliminated and lead 275 connected directly to lead 103.

After answer supervision and the termination of ringing, the bridge 400 may be disconnected from the line 300, if desired. The communication channel will be completed from the calling to the called party through windings 311 and 313 of transformer 310.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a signaling system, a two conductor signaling channel, a D.C. potential source connected across one end of said two conductor channel, a source of A.C. signals, control means for selectively applying said A.C. signals to said two conductor channel in series with said D.C. potential source at said one end thereof, ringer means connected across said two conductor channel responsive to and capable of passing only said A.C. signals, a direct current responsive device, switch means actuatable to selectively disconnect said ringer means and connect said direct current responsive device across said two conductor channel producing a change in voltage level in said channel, and diode bridge circuit means connected to one conductor of said channel responsive to an instantaneous change in voltage level thereacross for producing an output signal in response to detection of a voltage condition in said channel indicating actuation of said switch means.

2. The combination defined in claim 1 wherein said output signal is in the form of a pulse train and further including counter means responsive to said pulse train for disabling said control means to disconnect said source of A.C. signals from said channel a predetermined time after actuation of said switch means.

3. In a signaling system, a two-conductor signaling channel having first and second ends, an A.C. signal source, a D.C. potential source, transmitting means coupled to said first end for selectively transmitting a signal from said A.C. source over said channel from said first end to said second end wherein said signal has a predetermined frequency and is superimposed on said D.C. potential, terminating means at said second end for selectively terminating said channel with first and second circuits which do and do not, respectively, block the flow of direct current therethrough, sampling means coupled to said signaling channel at said first end to sample the character of the current in said channel and for providing an output signal when said second end is terminated with said second circuit, and control means coupled to said sampling means for terminating the transmission of said A.C. signal over said channel in response to said output signal, said sampling means including means for sampling the current in said channel at intervals which are aliquot to the period of said A.C. signal, said control means including timing means for timing the duration of said output signal.

4. In a signaling system, a two conductor signaling channel, a D.C. potential source connected across one end of said two conductor channel, a source of A.C. signals, control means for selectively applying said A.C. signals to said two conductor channel in series with said D.C. potential source at said one end thereof, ringer means connected across said two conductor channel at the other end thereof responsive solely to said A.C. signals, a direct current responsive device, switch means for selectively disconnecting said ringer means and connecting said direct current responsive device across said two conductor channel at said other end thereof, network means connected to said two conductor channel for providing a continuous signal indication of the voltage level of said two conductor channel, sampling means for periodically sampling the instantaneous voltage output of said network means and discriminator means for providing an output signal in response to detection of a sample output from said network means indicative of connection of said direct current responsive device to said two conductor channel, the output signal from said discriminator being in the form of a pulse train, and further including counter means responsive to said pulse train for disabling said control means to disconnect said source of A.C. signals from said channel a predetermined time after actuation of said switch means.

5. The combination defined in claim 4 wherein said network means includes an impedance and a rectifier bridge having an input connected to one conductor of said channel and an output connected to said impedance means.

6. The combination defined in claim 5 wherein said sampling means includes a bistable relay having bridging contacts and phase shift means connecting said bistable relay to said A.C. signal source under control of said control means, said discriminator means including a capacitor periodically connected to said impedance means by said bridging contacts and means for detecting the varying state of charge of said capacitor.

References Cited by the Examiner

UNITED STATES PATENTS

| | | | |
|---|---|---|---|
| 3,059,058 | 10/1962 | Abbott | 179—18.82 |
| 3,192,323 | 6/1965 | Hersey | 179—18.82 |

KATHLEEN H. CLAFFY, *Primary Examiner.*

WILLIAM C. COOPER, *Examiner.*

H. ZELLER, *Assistant Examiner.*